(12) United States Patent
Ushio et al.

(10) Patent No.: US 12,358,512 B2
(45) Date of Patent: Jul. 15, 2025

(54) IN-VEHICLE APPARATUS CONTROL SYSTEM, IN-VEHICLE APPARATUS, AND IN-VEHICLE APPARATUS CONTROL METHOD

(71) Applicant: FAURECIA CLARION ELECTRONICS CO., LTD., Saitama (JP)

(72) Inventors: Hiroe Ushio, Saitama (JP); Shingo Takei, Saitama (JP); Yuichiro Nakagawa, Saitama (JP)

(73) Assignee: FAURECIA CLARION ELECTRONICS CO., LTD., Saitama (JP)

( * ) Notice: Subject to any disclaimer, the term of this patent is extended or adjusted under 35 U.S.C. 154(b) by 185 days.

(21) Appl. No.: 17/469,732

(22) Filed: Sep. 8, 2021

(65) Prior Publication Data

US 2022/0073081 A1    Mar. 10, 2022

(30) Foreign Application Priority Data

Sep. 9, 2020    (JP) .................................. 2020-151066

(51) Int. Cl.
*B60W 40/08*        (2012.01)
*B60W 50/14*        (2020.01)
(Continued)

(52) U.S. Cl.
CPC ............ *B60W 40/08* (2013.01); *B60W 50/14* (2013.01); *G06V 20/593* (2022.01);
(Continued)

(58) Field of Classification Search
CPC ................. B60W 40/08; B60W 50/14; B60W 2040/0881; B60W 2420/40;
(Continued)

(56) References Cited

U.S. PATENT DOCUMENTS 9,439,065 B2 * 9/2016 Cho ...................... H04W 4/027
2010/0216441 A1 * 8/2010 Larsson .................. G06F 16/58
455/414.1
(Continued)

FOREIGN PATENT DOCUMENTS

JP          2016199124 A     12/2016
JP          2019-22012 A      2/2019
(Continued)

OTHER PUBLICATIONS

"Server (computing)" from Wikipedia, downloaded from www.archive.org, Aug. 16 2020 entry (Year: 2020).*
(Continued)

*Primary Examiner* — Peter D Nolan
*Assistant Examiner* — Tanya C Sienko
(74) *Attorney, Agent, or Firm* — REISING ETHINGTON P.C.

(57) ABSTRACT

A user's position inside a passenger compartment is judged easily and reliably and control according to the user's position is provided. An in-vehicle apparatus control system includes a server and an in-vehicle apparatus and is configured to communicate with a mobile terminal, such as a smart phone, that is located within the vehicle. The in-vehicle apparatus control system includes a storage unit that stores a face image of a user of the mobile terminal by associating the face image with identification information of the mobile terminal. The system also includes a seated position judgment unit that judges a seated position of the user by means of facial recognition to evaluate an inside passenger compartment image and the face image. The in-vehicle apparatus executes control according to the seated position of the user of the mobile terminal when accepting a specified control request from the mobile terminal.

3 Claims, 12 Drawing Sheets

(51) Int. Cl.
*G06V 20/59* (2022.01)
*G06V 40/16* (2022.01)
*H04W 88/02* (2009.01)

(52) U.S. Cl.
CPC .......... *G06V 40/166* (2022.01); *G06V 40/172* (2022.01); *B60W 2040/0881* (2013.01); *B60W 2420/40* (2013.01); *B60W 2540/227* (2020.02); *H04W 88/02* (2013.01)

(58) Field of Classification Search
CPC ........... B60W 2540/227; G06V 20/593; G06V 40/166; G06V 40/172; H04W 88/02
See application file for complete search history.

(56) References Cited

U.S. PATENT DOCUMENTS

| | | | |
|---|---|---|---|
| 2011/0208834 A1 | 8/2011 | Nagano et al. | |
| 2017/0150252 A1* | 5/2017 | Trestain | H04R 1/323 |
| 2017/0242148 A1 | 8/2017 | Yu et al. | |
| 2019/0251973 A1* | 8/2019 | Kume | G06F 3/167 |
| 2020/0159217 A1 | 5/2020 | Yamashita et al. | |
| 2020/0249822 A1* | 8/2020 | Penilla | G07C 5/008 |
| 2021/0086754 A1* | 3/2021 | Kim | G06F 3/017 |
| 2021/0097315 A1* | 4/2021 | Carruthers | G08B 13/19645 |
| 2021/0117524 A1* | 4/2021 | McKell-Redwood | H04L 9/3231 |
| 2022/0016999 A1* | 1/2022 | Burk | G06V 40/172 |

FOREIGN PATENT DOCUMENTS

| | | |
|---|---|---|
| JP | 2019139582 A | 8/2019 |
| JP | 2020086744 A | 6/2020 |

OTHER PUBLICATIONS

"Selfie—Wikipedia" downloaded from web.archive.org, Jun. 19, 2019 capture. (Year: 2019).*
Office action issued by the Japanese Patent Office for counterpart application JP2020-151066 on Jan. 16, 2024.
Machine Translation of the office action issued by the Japanese Patent Office for counterpart application JP2020-151066 on Jan. 16, 2024.
Office action issued by the USPTO for corresponding CIP U.S. Appl. No. 18/106,553 on Dec. 4, 2024.

* cited by examiner

IN-VEHICLE APPARATUS CONTROL SYSTEM, IN-VEHICLE APPARATUS, AND IN-VEHICLE APPARATUS CONTROL METHOD

CROSS-REFERENCE TO RELATED APPLICATION(S)

This application claims priority to Japanese Patent Application Number 2020-151066, filed on Sep. 9, 2020, the entire content of which is incorporated herein by reference.

BACKGROUND

Technical Field

The present invention relates to an in-vehicle apparatus control system, an in-vehicle apparatus, and an in-vehicle apparatus control method.

Background Art

There is Japanese Patent Application Laid-Open (Kokai) Publication No. 2019-22012 (hereinafter referred to as PTL 1) as a conventional technology. PTL 1 describes that "[a] mobile information terminal 2 has a function that transmits ultrasonic waves. Three or more ultrasonic wave sensors are located inside a passenger compartment of vehicle V and an ultrasonic wave receiving apparatus for receiving the ultrasonic waves by using these ultrasonic wave sensors is provided in the vehicle V. When each ultrasonic wave sensor receives the ultrasonic waves transmitted by the mobile information terminal 2, a position detection unit 12 acquires, for example, information indicating propagation time of the ultrasonic waves from the mobile information terminal 2 to each ultrasonic wave sensor or information indicating ultrasonic wave receiving intensity by each ultrasonic wave sensor from the ultrasonic wave receiving apparatus. The position detection unit 12 detects the position of the mobile information terminal 2 by means of so-called 'trilateration' by converting, for example, the propagation time or the receiving intensity into a distance."

PTL 1: Japanese Patent Application Laid-Open (Kokai) Publication No. 2019-22012

SUMMARY

Since PTL 1 detects the position of the mobile terminal by using the trilateration, it is necessary to locate, for example, a plurality of ultrasonic wave sensors in the passenger compartment. Installing the plurality of sensors or the like only for the purpose of detecting the position of the mobile terminal will lead to a cost increase and it also become difficult to later add the function detecting the position of the mobile information terminal. Furthermore, if the position of the mobile terminal is different from the user's position, PTL 1 cannot execute control according to the user's position. So, it is an object of the present invention to easily and reliably judge the user's position inside the passenger compartment and provide the control according to the user's position.

An in-vehicle apparatus control system according to an aspect of the present invention: stores a face image of a user of a mobile terminal by associating it with identification information of the mobile terminal; judges a seated position of the user by means of facial recognition by using an inside passenger compartment image, which captures an image of an inside of a passenger compartment; and the face image; and executes control according to the seated position of the user of the mobile terminal when accepting a specified control request from the mobile terminal.

The present invention makes it possible to easily and reliably judge the user's position inside the passenger compartment and provide the control according to the user's position.

DESCRIPTION OF EMBODIMENTS

An embodiment of the present invention will be explained with reference to the drawings.

Figure 1:
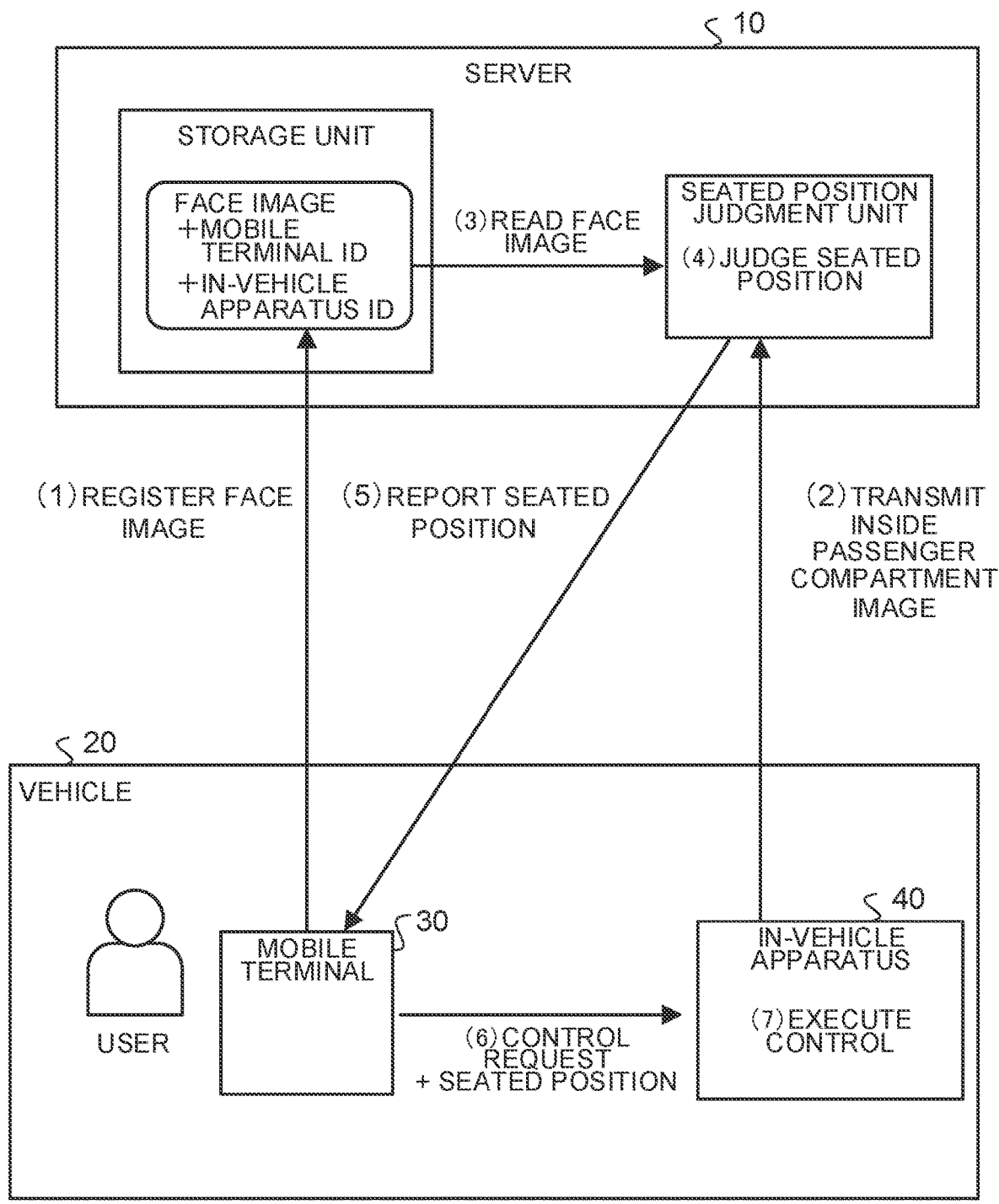
FIG. 1 is an explanatory diagram of an in-vehicle apparatus control system according to an embodiment of the present invention.

FIG. 1 is an explanatory diagram of an in-vehicle apparatus control system according to an embodiment of the present invention. The in-vehicle apparatus control system according to the embodiment includes a mobile terminal 30 (which is mounted in a vehicle 20), an in-vehicle apparatus 40, and a server 10.

The mobile terminal 30 is, for example, a smartphone and can acquire an in-vehicle apparatus ID, which is identification information of the in-vehicle apparatus 40, by connecting and communicating with the in-vehicle apparatus 40 via near field communication. When activating a specified application inside a passenger compartment, the mobile terminal 30 captures a face image of a user and registers the face image in the server 10 (1). When this happens, the mobile terminal 30 transmits a mobile terminal ID, which is identification information of the mobile terminal 30, and the in-vehicle apparatus ID together with the face image to the server 10; and the server 10 stores the face image, the mobile terminal ID, and the in-vehicle apparatus ID by associating the face image with the mobile terminal ID and the in-vehicle apparatus ID.

The in-vehicle apparatus 40 acquires an inside passenger compartment image and transmits it together with the in-vehicle apparatus ID to the server 10 (2). For example, if an image of the inside of the passenger compartment is included in an image captured to be recorded in a dashcam, that image can be used as the inside passenger compartment image.

If the server 10 receives the inside passenger compartment image and the in-vehicle apparatus ID from the in-vehicle apparatus 40, it extracts the face image registered in association with the received in-vehicle apparatus ID (3). The server 10 performs facial recognition by using the extracted face image and the inside passenger compartment image. If the face image which matches a person's face included in the inside passenger compartment image is identified, the server 10 judges a seated position from the position in the inside passenger compartment image and determines the seated position of the user of the mobile terminal 30 associated with the face image (4). The server 10 notifies this mobile terminal 30 of the seated position (5).

The mobile terminal 30 receives the notice of the seated position from the server 10 and stores it as the seated position of the user of the terminal itself. Subsequently, the mobile terminal 30 can designate the stored seated position when transmitting a control request to the in-vehicle apparatus 40 (6).

If the in-vehicle apparatus 40 receives the control request from the mobile terminal 30 by designating the seated position, it executes control according to the designated seated position (7).

Specifically speaking, the mobile terminal 30 can transmit a sound volume control request to the in-vehicle apparatus 40 by designating the user's seated position. In this case, the in-vehicle apparatus 40 controls a speaker so that the sound volume at the designated seated position will satisfy the request.

The control request which designates the seated position can be used for, for example, air conditioning control, control of a seat angle or the like, locking/unlocking, and control of indoor lighting besides the sound volume control. Incidentally, when sending the control request from the mobile terminal 30 to the in-vehicle apparatus 40, it is not essential to designate the seated position and a control request which does not require the designation of the seated position should not be precluded from being transmitted.

Accordingly, with the in-vehicle apparatus control system illustrated in FIG. 1, the server 10 stores the face image of the user of the mobile terminal 30 by associating it with the mobile terminal ID and judges the user's seated position by executing facial recognition by using the inside passenger compartment image, which captures an image of the inside of the passenger compartment, and the face image. Then, when the in-vehicle apparatus 40 receives a specified control request from the mobile terminal 30, it executes control according to the seated position of the user of the relevant mobile terminal 30. Therefore, the user's position inside the passenger compartment can be judged easily and reliably and the control according to the user's position can be provided.

Figure 2:
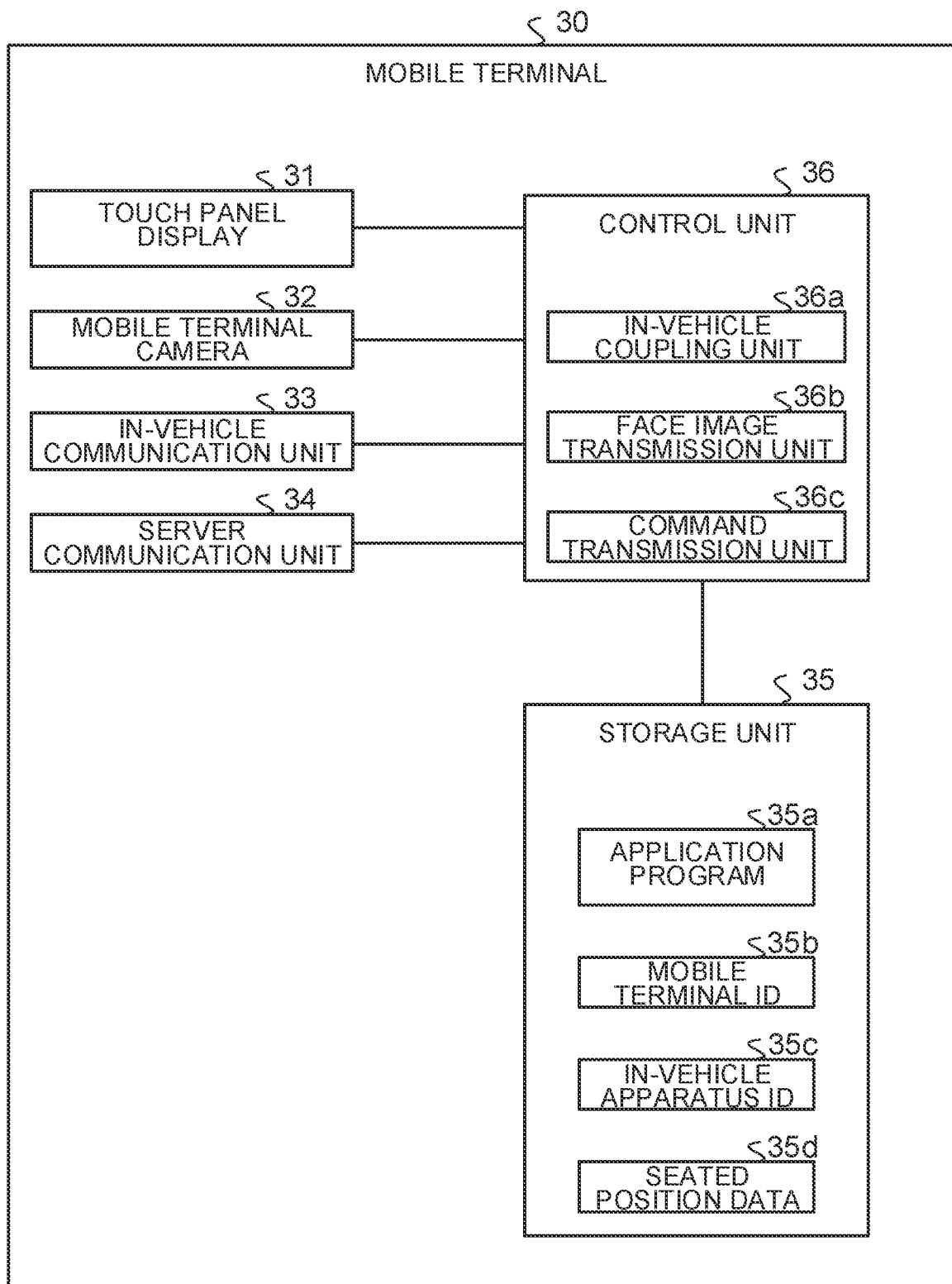
FIG. 2 is a configuration diagram illustrating the configuration of a mobile terminal.

FIG. 2 is a configuration diagram illustrating the configuration of the mobile terminal 30. The mobile terminal 30 is, for example, a smartphone and includes a touch panel display 31, a mobile terminal camera 32, an in-vehicle communication unit 33, a server communication unit 34, a storage unit 35, and a control unit 36.

The touch panel display 31 is an input-output interface for accepting inputs from the user and outputs display. The mobile terminal camera 32 is used to capture the user's face image(s) in this embodiment. The in-vehicle communication unit 33 is a communication interface for connecting and communicating with the in-vehicle apparatus 40 via near field communication. For example, Bluetooth (registered trademark) may be used as the near field communication. The server communication unit 34 is a communication interface for connecting and communicating with the server 10.

The storage unit 35 is a storage device such as a flash memory. The storage unit 35 stores, for example, an application program 35*a*, a mobile terminal ID 35*b*, an in-vehicle apparatus ID 35*c*, and seated position data 35*d*.

The application program 35*a* implements various kinds of functions by being executed by the control unit 36. In this embodiment, the application program 35*a* implements a function as a remote controller for demanding control by the in-vehicle apparatus 40 and can thereby capture the user's face image(s) and communicate with the server 10.

The mobile terminal ID 35*b* is identification information for uniquely identifying the mobile terminal 30. The in-vehicle apparatus ID 35*c* is acquired from the in-vehicle apparatus 40 and stored when the near field communication is established with the in-vehicle apparatus 40. Since the in-vehicle apparatus 40 is secured to the vehicle 20, the in-vehicle apparatus ID indicates where in the vehicle the mobile terminal 30 is located.

The seated position data 35*d* is data which indicates the seated position received from the server 10. This seated position data 35*d* makes it possible to identify at which position inside the vehicle the user of the mobile terminal 30 is seated. Specifically speaking, for example, a driver's seat, an assistant driver's seat, a right-side rear seat, and a left-side rear seat are used as seated positions.

Incidentally, when the user gets off the vehicle and the near field communication between the mobile terminal 30 and the in-vehicle apparatus 40 is disconnected, it is desirable to delete the in-vehicle apparatus ID 35*c* and the seated position data 35*d* from the storage unit 35.

The control unit 36 is, for example, a CPU (Central Processing Unit) and implements a remote control function of the in-vehicle apparatus 40 by reading and executing the application program 35*a*. Specifically speaking, as the application program 35*a* is executed, the control unit 36 operates as an in-vehicle coupling unit 36*a*, a face image transmission unit 36*b*, and a command transmission unit 36*c*.

Upon activation of the application program 35*a*, the in-vehicle coupling unit 36*a* executes processing for establishing communication with the in-vehicle apparatus 40, acquiring the in-vehicle apparatus ID from the in-vehicle apparatus 40, and storing the acquired in-vehicle apparatus ID as the in-vehicle apparatus ID 35*c* in the storage unit 35.

After acquiring the in-vehicle apparatus ID upon the activation of the application program 35*a*, the face image transmission unit 36*b* causes the mobile terminal camera 32 to capture the user's face image and transmits the face image together with the mobile terminal ID 35*b* and the in-vehicle apparatus ID 35*c* to the server 10, thereby requesting registration of the face image. Furthermore, once the face image transmission unit 36*b* receives the seated position from the server 10, it stores the seated position data 35*d*, which indicates the received seated position, in the storage unit 35.

The command transmission unit 36*c* is a processing unit that receives an operation from the user, generates a control request, that is, a command to be transmitted to the in-vehicle apparatus 40, and transmits the command to the in-vehicle apparatus 40. When this happens, the command transmission unit 36*c* can transmit the seated position data 35*d* together with the command.

Figure 3:
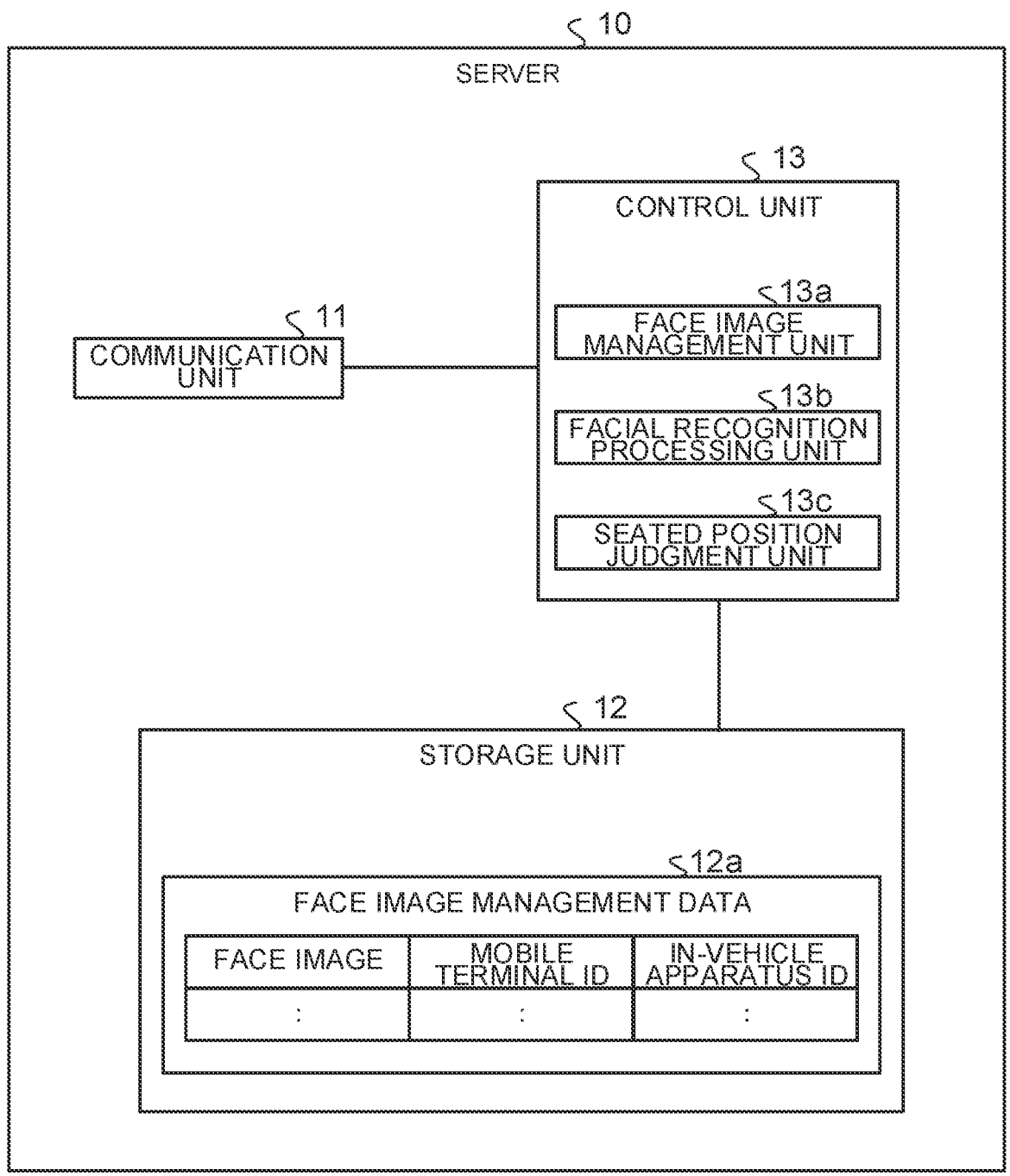
FIG. 3 is a configuration diagram illustrating the configuration of a server.

FIG. 3 is a configuration diagram illustrating the configuration of the server 10. The server 10 includes, as illustrated in FIG. 3, a communication unit 11, a storage unit 12, and a control unit 13. The communication unit 11 is a communication interface for connecting and communicating with the mobile terminal 30 and the in-vehicle apparatus 40.

The storage unit 12 is a storage device such as a hard disk drive or a flash memory and stores face image management data 12a. The face image, the mobile terminal ID, and the in-vehicle apparatus ID which are received from the mobile terminal 30 are associated with each other and registered in the face image management data 12a.

The control unit 13 is, for example, a CPU and operates as a face image management unit 13a, a facial recognition processing unit 13b, and a seated position judgment unit 13c by executing specified programs. When receiving the face image, the mobile terminal ID, and the in-vehicle apparatus ID from the mobile terminal 30, the face image management unit 13a registers them in the face image management data 12a by associating the face image with the mobile terminal ID and the in-vehicle apparatus ID.

When receiving the inside passenger compartment image and the in-vehicle apparatus ID from the in-vehicle apparatus 40, the facial recognition processing unit 13b extracts the face image, which is registered in association with the received in-vehicle apparatus ID, from the face image management data 12a and performs the facial recognition by using the extracted face image and the inside passenger compartment image.

When a face image which matches a person's face included in the inside passenger compartment image is identified by the facial recognition processing unit 13b, the seated position judgment unit 13c judges a seated position from the position in the inside passenger compartment image and determines it as the seated position of the user of the mobile terminal 30 associated with the face image. The seated position judgment unit 13c notifies this mobile terminal 30 of the seated position.

Figure 4:
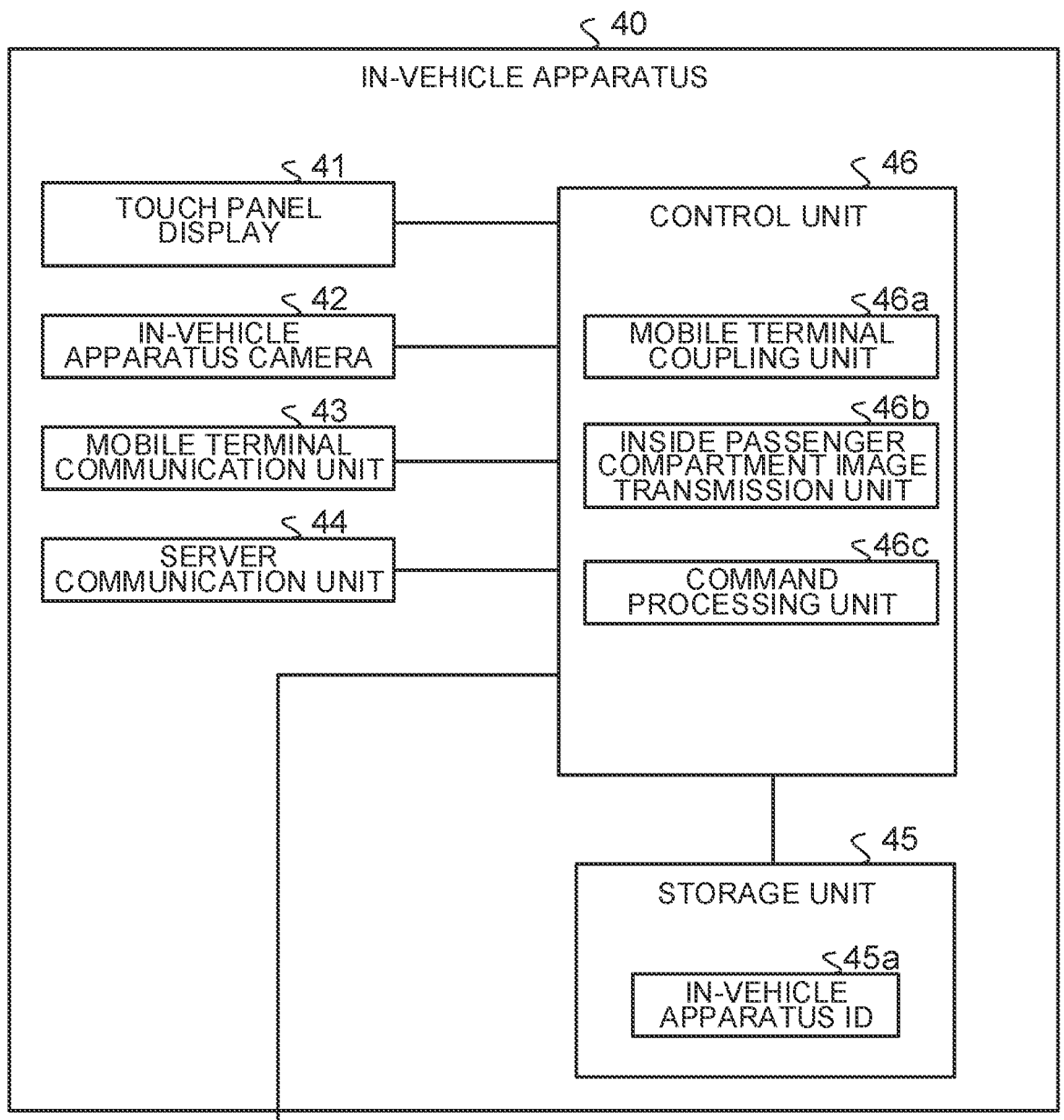
FIG. 4 is a configuration diagram illustrating the configuration of an in-vehicle apparatus.

FIG. 4 is a configuration diagram illustrating the configuration of the in-vehicle apparatus 40. The in-vehicle apparatus 40 includes a touch panel display 41, an in-vehicle apparatus camera 42, a mobile terminal communication unit 43, a server communication unit 44, a storage unit 45, and a control unit 46.

The touch panel display 41 is an input-output interface for accepting inputs from the user and outputting display. The in-vehicle apparatus camera 42 is a camera capable of capturing an inside passenger compartment image(s). A camera for a dashcam should preferably be used as this camera. Specifically speaking, the in-vehicle apparatus 40 may have a function as the dashcam or may be configured to use both the dashcam and the in-vehicle apparatus camera 42. The mobile terminal communication unit 43 is a communication interface for connecting and communicating with the mobile terminal 30 via the near field communication. The server communication unit 44 is a communication interface for connecting and communicating with the server 10.

The storage unit 45 is a storage device such as a flash memory. The storage unit 45 stores, for example, an in-vehicle apparatus ID 45a. The in-vehicle apparatus ID 45a is identification information for uniquely identifying the in-vehicle apparatus 40.

The control unit 46 is, for example, a CPU and includes a mobile terminal coupling unit 46a, an inside passenger compartment image transmission unit 46b, and a command processing unit 46c by reading specified programs.

The mobile terminal coupling unit 46a executes processing for establishing communication with the mobile terminal 30 and transmitting the in-vehicle apparatus ID 45a to the mobile terminal 30.

The inside passenger compartment image transmission unit 46b is a processing unit that transmits the inside passenger compartment image(s) captured by the in-vehicle apparatus camera 42 and the in-vehicle apparatus ID 45a to the server. The inside passenger compartment image may be transmitted, for example, regularly at certain intervals.

The command processing unit 46c is a processing unit that executes commands received from the mobile terminal 30. Specifically speaking, the command processing unit 46c can execute, for example, commands with respect to sound volume control, air conditioning control, seat angle control, locking unlocking, and indoor lighting control. A command is executed by controlling actions of a speaker, an air conditioner, a seat angle adjustment mechanism, a locking mechanism, indoor lighting equipment, and so on which are mounted in the vehicle 20. If the seated position is received together with the command under the above-described circumstance, the command processing unit 46c controls actions of the various kinds of equipment so as to satisfy the designation of the command at the received seated position.

Figure 5:
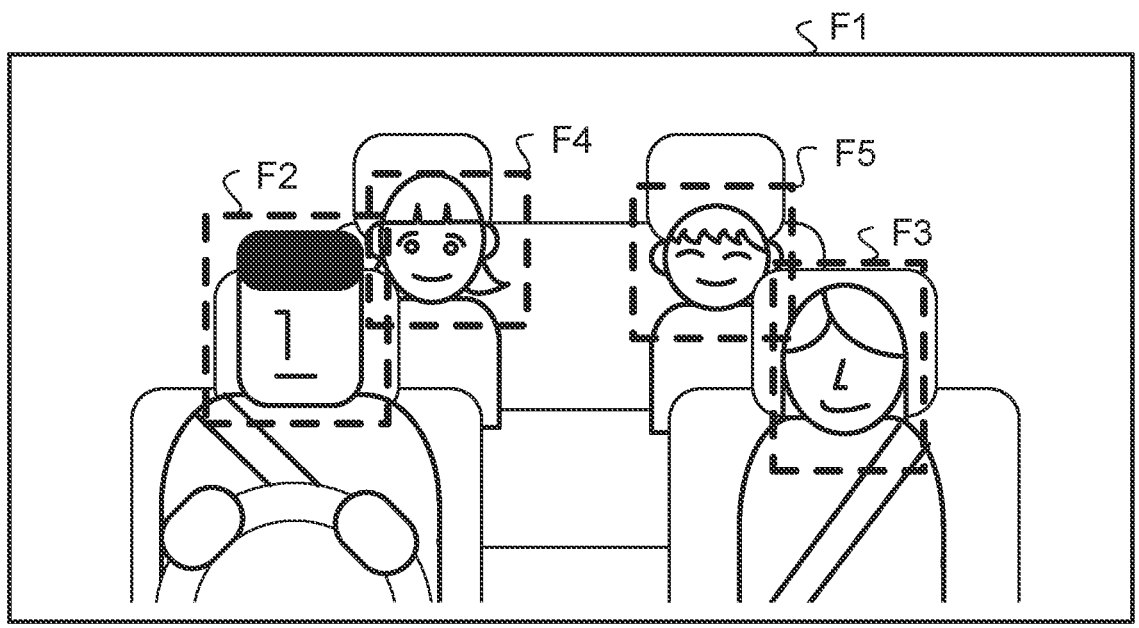
FIG. 5 is an explanatory diagram for illustrating a specific example of an inside passenger compartment image.

FIG. 5 is an explanatory diagram illustrating a specific example of an inside passenger compartment image. Referring to FIG. 5, an inside passenger compartment image F1 includes images of a plurality of person's faces. A partial image F2 in the inside passenger compartment image F1 includes a face image of a person who is seated at a driver's seat and a partial image F3 includes a face image of a person who is seated at an assistant driver's seat. Similarly, a partial image F4 includes a face image of a person who is seated at a right-side rear seat and a partial image F5 includes a face image of a person who is seated at a left-side rear seat.

Since the in-vehicle apparatus camera 42 is secured to the vehicle 20, the positions of the partial images F2 to F5 in the inside passenger compartment image F1 correspond to the seated positions. Therefore, if a person included in the inside passenger compartment image F1 is identified by using the facial recognition, the seated position of that person can be determined depending on which position in the inside passenger compartment image F1 the relevant face image is located.

Figure 6:
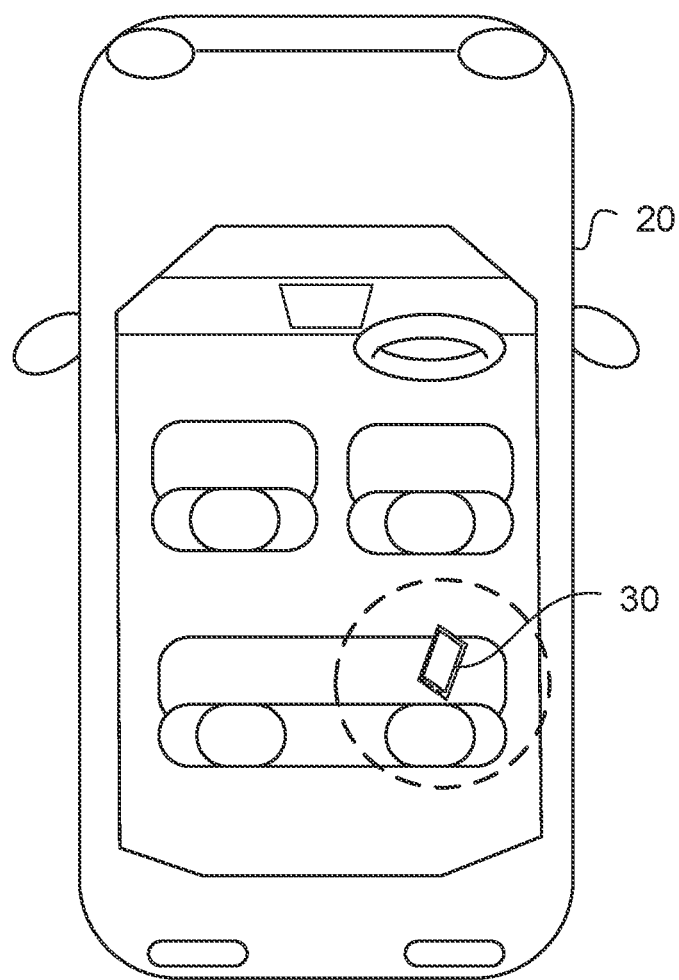
FIG. 6 is an explanatory diagram of control based on a seated position.

FIG. 6 is an explanatory diagram of control based on the seated position. Referring to FIG. 6, the seated position of the user of the mobile terminal 30 is the right-side rear seat of the vehicle 20. If the mobile terminal 30 in this situation transmits a command to request the sound volume control together with the seated position, the in-vehicle speaker will be controlled so that the sound volume at the right-side rear seat will become as designated by the command. Incidentally, for the sake of convenience, FIG. 6 illustrates the case where the position of the mobile terminal 30 matches the user's seated position; however, since the mobile terminal 30 transmits the user's seated position, the control can be performed with respect to the user's seated position even if the position of the mobile terminal 30 is different from the user's seated position.

Figure 7:
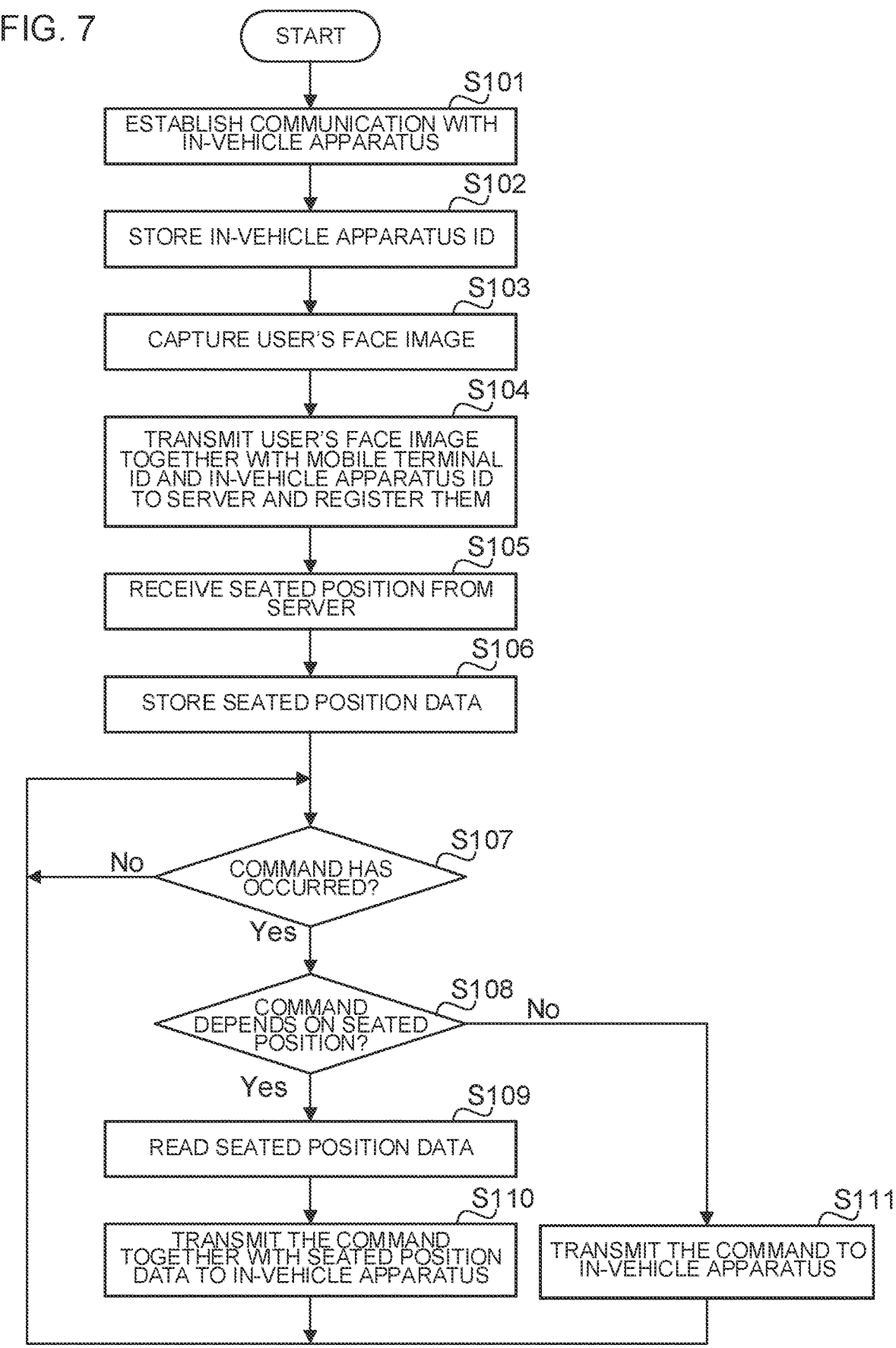
FIG. 7 is a flowchart illustrating a processing sequence of the mobile terminal.

FIG. 7 is a flowchart illustrating a processing sequence of the mobile terminal 30. Firstly, when the control unit 36 activates the application program 35a, the in-vehicle coupling unit 36a establishes communication with the in-vehicle apparatus 40 (step S101). The in-vehicle coupling unit 36a which has established communication acquires the in-vehicle apparatus ID from the in-vehicle apparatus 40 and stores it as the in-vehicle apparatus ID 35c in the storage unit 35 (step 3102).

After acquiring and storing the in-vehicle apparatus ID, the face image transmission unit 36b causes the mobile terminal camera 32 to capture the user's face image (step S103) and requests the registration of the face image by transmitting the face image together with the mobile terminal ID 35*b* and the in-vehicle apparatus ID 35*c* to the server 10 (step 3104). When the face image transmission unit 36*b* receives the seated position from the server 10 (step S105), it stores the seated position data 35*d*, which indicates the received seated position, in the storage unit 35 (step S106).

After step 3106, the command transmission unit 36*c* monitors the occurrence of a command(s) (step S107). The command occurs by, for example, accepting the operation from the user. If no command has occurred (step S107; No), the command transmission unit 36*c* repeats step 3107.

If the command occurs (step 3107; Yes), the command transmission unit 36*c* judges whether the command is a command which depends on the seated position or not (step 3108). If it is not the command which depends on the seated position (step S108; No), the command transmission unit 36*c* transmits the occurred command to the in-vehicle apparatus 40 (step S111) and the processing returns to step S107.

If it is the command which depends on the seated position (step S108; Yes), the command transmission unit 36*c* reads the seated position data 35*d* from the storage unit 35 (step S109) and transmits the command together with the seated position data to the in-vehicle apparatus 40 (step S110), and the processing returns to step S107.

Figure 8:
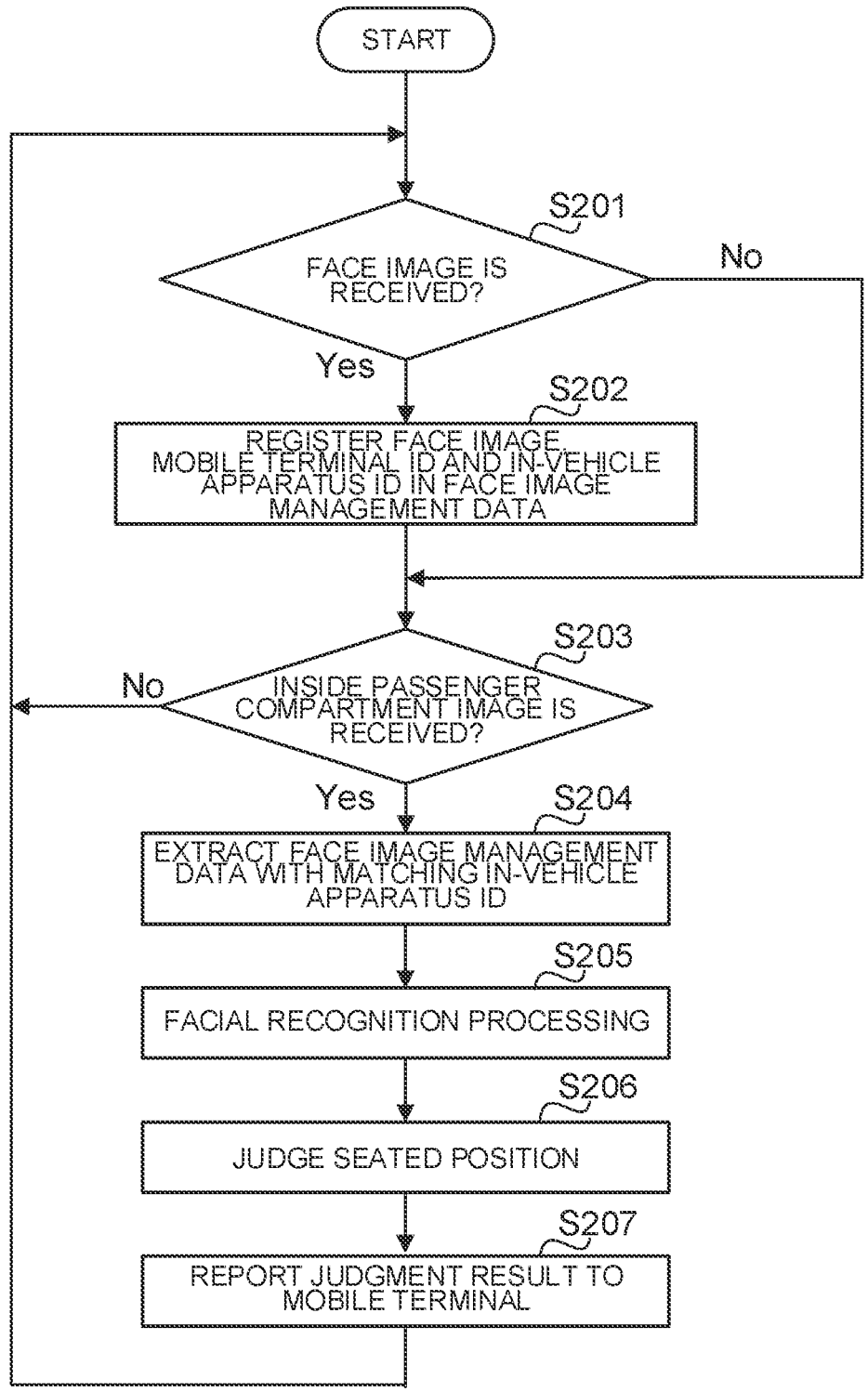
FIG. 8 is a flowchart illustrating a processing sequence of the server.

FIG. 8 is a flowchart illustrating a processing sequence of the server 10. The face image management unit 13*a* for the server 10 judges whether it has received a face image from the mobile terminal 30 or not (step S201). If the face image is received from the mobile terminal 30 (step S201; Yes), the face image management unit 13*a* registers the face image in the face image management data 12*a* by associating the face image with the mobile terminal ID and the in-vehicle apparatus ID which are received together with the face image (step S202).

After step S202 or if the face image is not received (step S201; No), the facial recognition processing unit 13*b* judges whether it has received an inside passenger compartment image from the in-vehicle apparatus 40 or not (step S203). If the inside passenger compartment image is not received (step S203; No), the processing returns to step S201.

If the inside passenger compartment image is received (step S203; Yes), the facial recognition processing unit 13*b* extracts a face image(s), which is registered in association with the in-vehicle apparatus ID received together with the inside passenger compartment image, from the face image management data 12*a* (step S204) and performs the facial recognition by using the extracted face image and the inside passenger compartment image (step S205).

After step S205, the seated position judgment unit 13*c* judges the seated position from the position of the image of the person identified by the facial recognition in the inside passenger compartment image (step S206). The seated position judgment unit 13*c* notifies the mobile terminal 30 of the person identified by the facial recognition of the seated position (step S207) and the processing returns to step S201.

Figure 9:
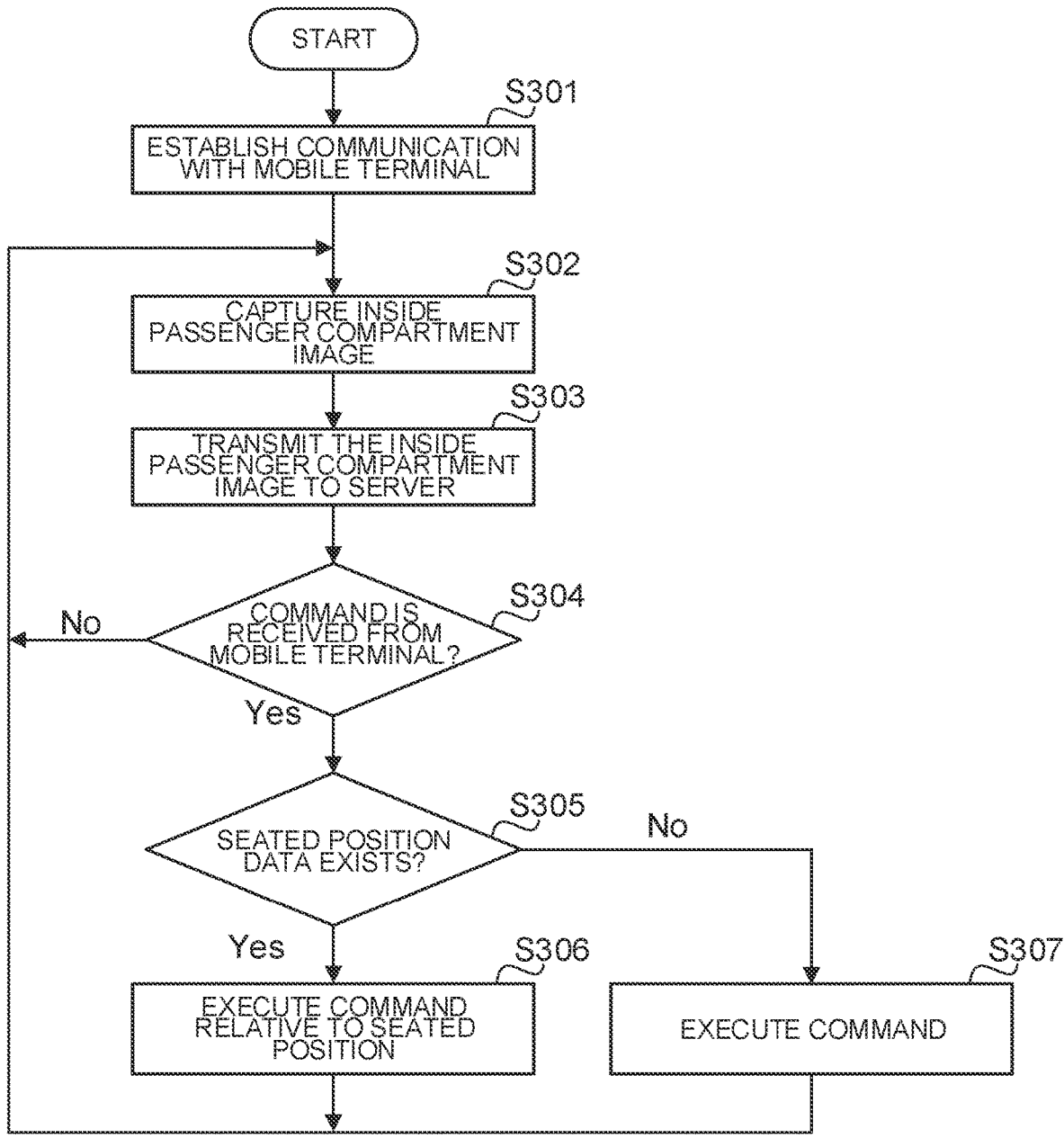
FIG. 9 is a flowchart illustrating a processing sequence of the in-vehicle apparatus.

FIG. 9 is a flowchart illustrating a processing sequence of the in-vehicle apparatus 40. The mobile terminal coupling unit 46*a* for the in-vehicle apparatus 40 firstly establishes communication with the mobile terminal 30 and transmits the in-vehicle apparatus ID 45*a* to the mobile terminal 30 (step 3301).

After step 3301, the inside passenger compartment image transmission unit 46*b* causes the in-vehicle apparatus camera 42 to capture an inside passenger compartment image (step 3302) and transmits the inside passenger compartment image and the in-vehicle apparatus ID 45*a* to the server (step S303).

The command processing unit 46*c* monitors whether a command is received from the mobile terminal 30 or not (step S304). If no command is received (step S304; No), the processing returns to step 3302.

If the command is received (step 3304; Yes), the command processing unit 46*c* judges whether the seated position data is received together with the command or not (step 3305). If the seated position data is received together with the command (step 3305; Yes), the command processing unit 46*c* executes the command with respect to the seated position (step S306) and the processing returns to step S302. On the other hand, if the seated position data is not received (step S305; No), the command processing unit 46*c* executes the command (step S307) and the processing returns to step S302.

The above-mentioned explanation has illustrated the configuration designed such that the server judges the seated position and the mobile terminal 30 stores the seated position; however, the present invention is not limited to the above-described configuration and can be implemented in various kinds of variations, (Variation 1)

Figure 10:
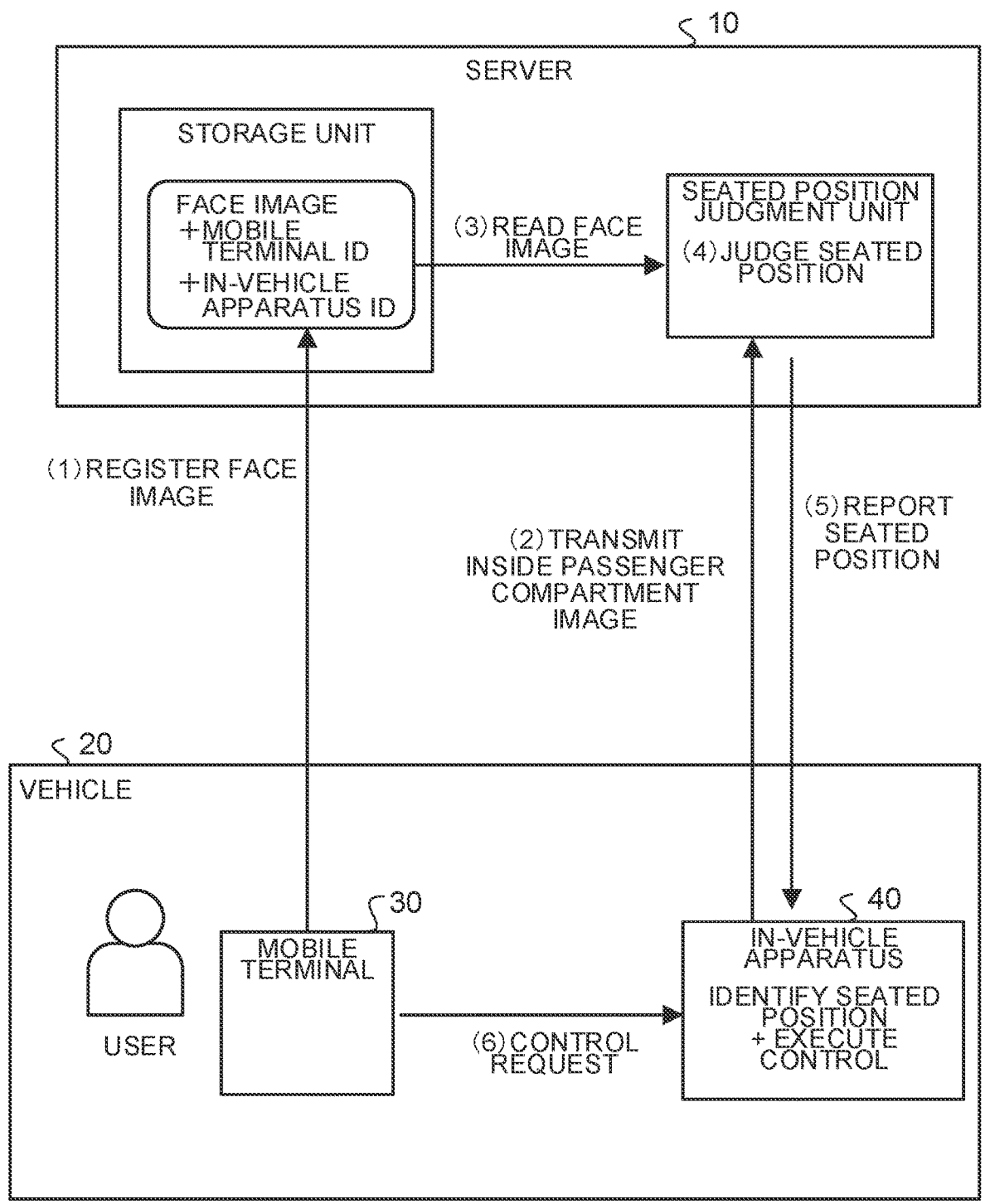
FIG. 10 is an explanatory diagram of Variation 1.

FIG. 10 is an explanatory diagram of Variation 1. With an in-vehicle apparatus control system of Variation 1, the seated position judged by the server 10 is transmitted to the in-vehicle apparatus 40 and the in-vehicle apparatus 40 stores the seated position. Actions of the in-vehicle apparatus control system of Variation 1 will be explained below.

Firstly, processing from (1) the registration of the face image to (4) the judgment of the seated position is similar to that of FIG. 1. After the judgment of the seated position, the server 10 notifies the in-vehicle apparatus 40 of the mobile terminal ID and the seated position which are associated with the face image (5). The in-vehicle apparatus 40 which has received the notice stores the seated position and the mobile terminal ID by associating them with each other.

Subsequently, the mobile terminal 30 transmits a control request to the in-vehicle apparatus 40 (6). When transmitting this control request, the seated position cannot be designated directly, but it is possible to designate that "the seated position of the user of the mobile terminal 30 should be a target to be controlled."

If the in-vehicle apparatus 40 receives the control request from the mobile terminal 30, it identifies the seated position of the mobile terminal 30 on the basis of the mobile terminal ID and executes the designated control (7). Accordingly, the in-vehicle apparatus 40 can execute the control by targeting at the seated position of the user of the mobile terminal 30.

(Variation 2)

Figure 11:
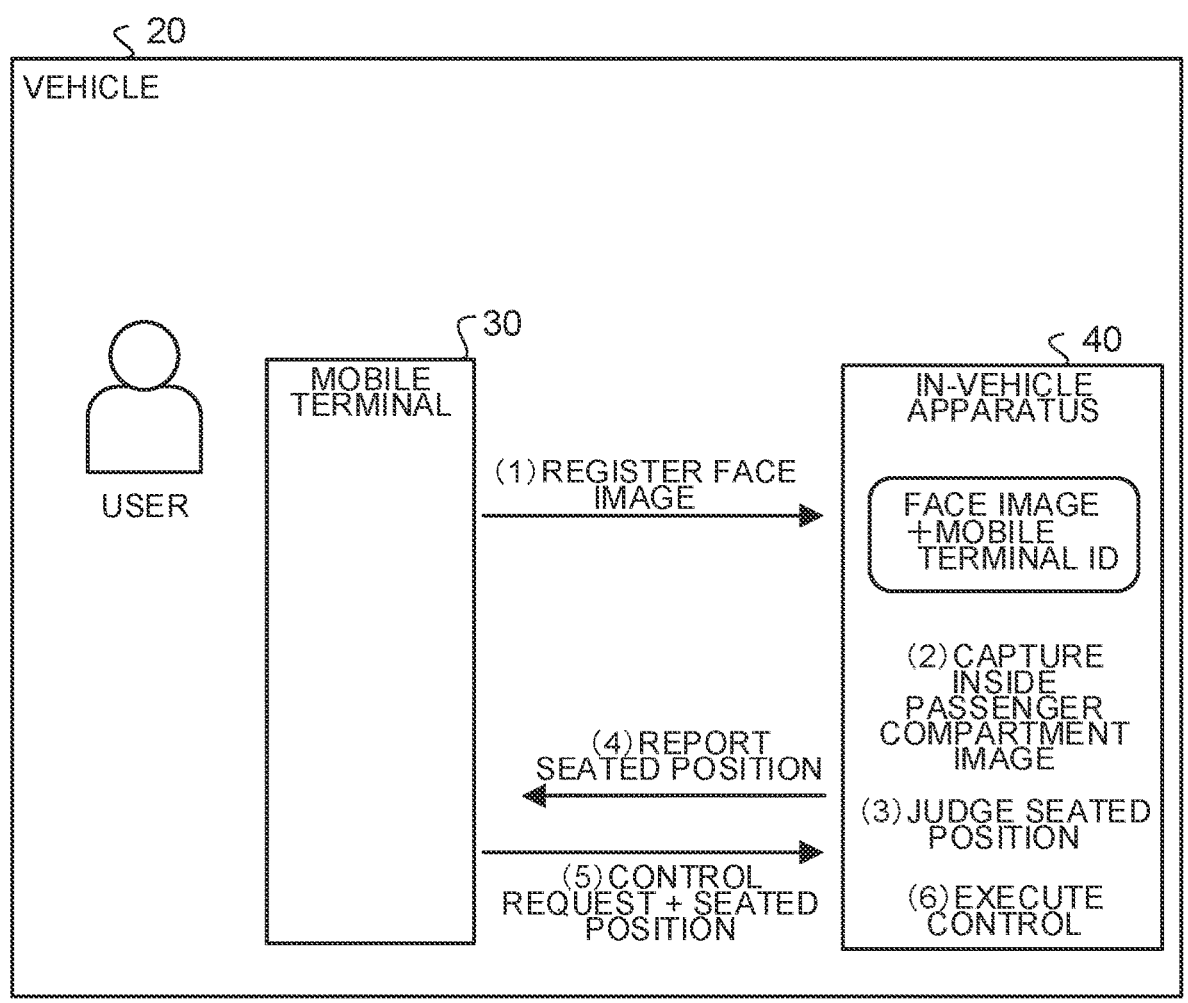
FIG. 11 is an explanatory diagram of Variation 2.

FIG. 11 is an explanatory diagram of Variation 2. With an in-vehicle apparatus control system of Variation 2, the in-vehicle apparatus 40 judges the seated position and the mobile terminal 30 stores the seated position. Actions of the in-vehicle apparatus control system of Variation 2 will be explained below.

When activating a specified application inside the passenger compartment, the mobile terminal 30 captures the user's face image and transmits the face image together with the mobile terminal ID to the in-vehicle apparatus 40, thereby registering the face image (1). The in-vehicle apparatus 40 stores the face image and the mobile terminal ID by associating them with each other.

The in-vehicle apparatus 40 regularly captures an inside passenger compartment image (2) and performs the facial recognition by using the stored face image and the inside passenger compartment image. If a face image which matches a person's face included in the inside passenger compartment image is identified, the in-vehicle apparatus 40 judges a seated position from the position in the inside passenger compartment image and determines it as the seated position of the user of the mobile terminal 30 associated with the face image (3). The in-vehicle apparatus 40 notifies this mobile terminal 30 of the seated position (4).

The mobile terminal 30 receives the notice of the seated position from the in-vehicle apparatus 40 and stores it as the seated position of the user of the terminal itself. Subsequently, the mobile terminal 30 can designate the stored seated position when transmitting a control request to the in-vehicle apparatus 40 (5).

When receiving the control request, which designates the seated position, from the mobile terminal 30, the in-vehicle apparatus 40 executes the control according to the designated seated position (6).

(Variation 3)

Figure 12:
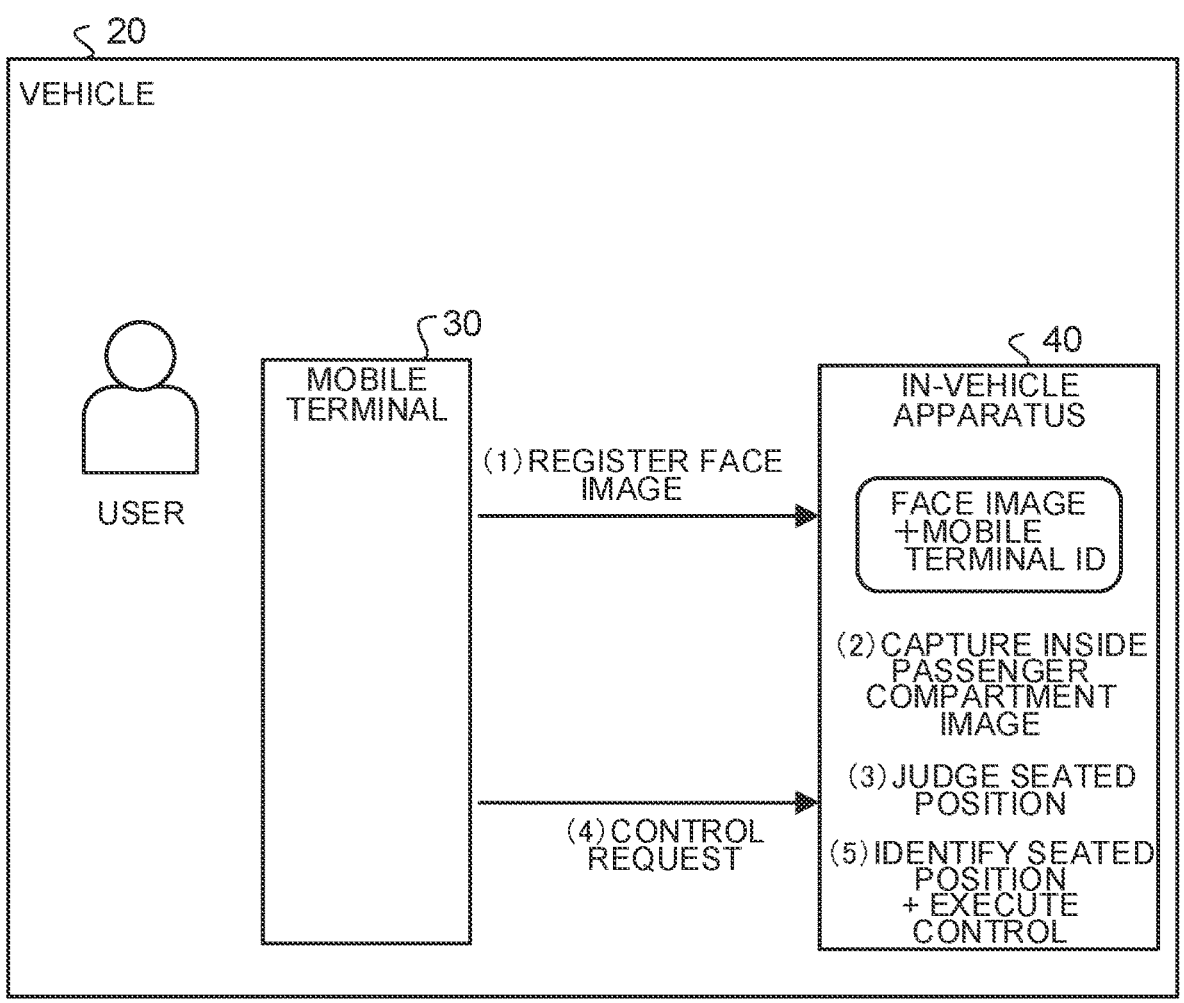
FIG. 12 is an explanatory diagram of Variation 3.

FIG. 12 is an explanatory diagram of Variation 3. With an in-vehicle apparatus control system of Variation 3, the in-vehicle apparatus 40 judges and stores the seated position. Actions of the in-vehicle apparatus control system of Variation 3 will be explained below.

When activating a specified application inside the passenger compartment, the mobile terminal 30 captures the user's face image and transmits the face image together with the mobile terminal ID to the in-vehicle apparatus 40, thereby registering the face image (1). The in-vehicle apparatus 40 stores the face image and the mobile terminal ID by associating them with each other.

The in-vehicle apparatus 40 regularly captures an inside passenger compartment image (2) and performs the facial recognition by using the stored face image and the inside passenger compartment image. If a face image which matches a person's face included in the inside passenger compartment image is identified, the in-vehicle apparatus 40 judges a seated position from the position in the inside passenger compartment image and determines it as the seated position of the user of the mobile terminal 30 associated with the face image (3). The in-vehicle apparatus 40 stores the seated position by associating it with the mobile terminal ID of this mobile terminal 30.

Subsequently, the mobile terminal 30 transmits a control request to the in-vehicle apparatus 40 (4). When transmitting this control request, the seated position cannot be designated directly, but it is possible to designate that the seated position of the user of the mobile terminal 30 should be a target to be controlled."

When the in-vehicle apparatus 40 receives the control request from the mobile terminal 30, it designates the seated position of the mobile terminal 30 on the basis of the mobile terminal ID and executes the designated control (5). Accordingly, the in-vehicle apparatus 40 can execute the control by targeting at the seated position of the user of the mobile terminal 30.

According to this embodiment as described above, the in-vehicle apparatus control system which couples the in-vehicle apparatus 40, which is installed in a vehicle, to the mobile terminal 30 in a communicable manner: stores the face image of the user of the mobile terminal 30 by associating it with the identification information of the mobile terminal 30; and judges the user's seated position by means of the facial recognition by using the inside passenger compartment image, which captures an image of the inside of the passenger compartment, and the face image. Then, when accepting a specified control request from the mobile terminal 30, the in-vehicle apparatus 40 executes the control according to the seated position of the user of the relevant mobile terminal. The in-vehicle apparatus control system makes it possible to easily and reliably judge the user's position inside the passenger compartment and provide the control according to the user's position.

Specifically speaking, the in-vehicle apparatus control system can be designed so that: the mobile terminal 30 captures the user's face image, associates the face image with the identification information of the mobile terminal 30, and transmits the face image to the server 10; the in-vehicle apparatus 40 captures the inside passenger compartment image and transmits it to the server 10; and the server 10 stores the face image and the identification information of the mobile terminal 30 and judges the seated position. As the server 10 manages the face image(s) and judges the seated position as described above, it is possible to curb the cost of the mobile terminal 30 and the in-vehicle apparatus 40 and provide the control according to the user's position.

Furthermore, the in-vehicle apparatus control system may be designed so that: the mobile terminal 30 captures the user's face image, associates the face image with the identification information of the mobile terminal 30, and transmits the face image to the in-vehicle apparatus 40; and the in-vehicle apparatus 40 captures the inside passenger compartment image, manages the face image(s), and judges the seated position. The above-described configuration does not require the management and operation of the server and it is further possible to provide the control according to the user's position without requiring the communication with outside of the vehicle.

Furthermore, if the in-vehicle apparatus control system may be designed so that the mobile terminal 30 stores the seated position and transmits the seated position, together with a specified control request, to the in-vehicle apparatus 40, it is possible to suppress burden on the in-vehicle apparatus 40 and provide control according to the user's position. Similarly, if the configuration may be designed so that the in-vehicle apparatus 40 stores the seated position and the identification information of the mobile terminal 30 by associating them with each other and identifies the seated position on the basis of the identification information of the mobile terminal when receiving the specified control request from the mobile terminal 30, it is possible to suppress burden on the mobile terminal 30 and provide control according to the user's position.

The control targeted at the seated position includes control relating to sounds. Specifically speaking, when receiving a control request from the mobile terminal 30 that relates to sounds, the in-vehicle apparatus 40 can execute control regarding such sounds at the seated position of the user of the mobile terminal 30.

Furthermore, if the camera of the dashcam is used as the in-vehicle apparatus image capturing unit capable of capturing the inside passenger compartment image(s), it is possible to effectively make full use of existing equipment and provide control according to the user's position at low cost without requiring additional equipment.

Incidentally, the present invention is not limited to the aforementioned embodiment and can be implemented by changing the configuration and actions as appropriate. For example, the embodiment has described, as an example to provide a simple and clear explanation, the configuration that transmits and stores the face image; however, the configuration may be designed so that a feature amount extracted from the face image may be transmitted and stored. Furthermore, the configuration may be also designed so that a partial image or the like corresponding to the seated position may be cut out and transmitted without transmitting the entire inside passenger compartment image.

Furthermore, the center of the rear seat can also be set as one of the seated positions or there may be two rows of rear seats.

Furthermore, the configuration may be designed so that data indicating the correspondence relationship between the inside passenger compartment images and the seated positions is generated according to vehicles and vehicle types and is retained by the in-vehicle apparatus 40 and the server 10.

REFERENCE SIGNS LIST

10: server
11: communication unit
12: storage unit
12a: face image management data
13: control unit
13a: face image management unit
13b: facial recognition processing unit
13c: seated position judgment unit
20: vehicle
30: mobile terminal
31: touch panel display
32: mobile terminal camera
33: in-vehicle communication unit
34: server communication unit
35: storage unit
35a: application program
35b: mobile terminal ID
35c: in-vehicle apparatus ID
35d: seated position data
36: control unit
36a: in-vehicle coupling unit
36b: face image transmission unit
36c: command transmission unit
40: in-vehicle apparatus
41: touch panel display
42: in-vehicle apparatus camera
43: mobile terminal communication unit
44: server communication unit
45: storage unit
45a: in-vehicle apparatus ID
46: control unit
46a: mobile terminal coupling unit
46b: inside passenger compartment image transmission unit
46c: command processing unit 46c

What is claimed is:

1. An in-vehicle apparatus control system coupling an in-vehicle apparatus installed in a vehicle to a mobile terminal in a communicable manner,
the in-vehicle apparatus control system comprising:
a server that communicates with the in-vehicle apparatus and the mobile terminal; and
the mobile terminal,
wherein the server comprises:
a storage unit that stores a face image of a user of the mobile terminal by associating the face image with identification information of the mobile terminal and identification information of the in-vehicle apparatus; and
a seated position judgment unit,
wherein the mobile terminal comprises:
an in-vehicle coupling unit that acquires the identification information of the in-vehicle apparatus upon beginning communication with the in-vehicle apparatus;
a mobile terminal image capturing unit that captures a user's face image;
a face image transmission unit that transmits, to the server, the face image associated with the identification information of the mobile terminal and the identification information of the in-vehicle apparatus; and
a command transmission unit that transmits, to the in-vehicle apparatus, a command which is a control request,
wherein the in-vehicle apparatus comprises:
a mobile terminal coupling unit that transmits the identification information of the in-vehicle apparatus upon beginning communication with the mobile terminal;
an in-vehicle apparatus image capturing unit that captures an inside passenger compartment image which is an image of an inside of a passenger compartment; and
an inside passenger compartment image transmission unit that transmits the inside passenger compartment image and the identification information of the in-vehicle apparatus,
wherein the seated position judgment unit:
judges a seated position of the user by means of facial recognition by using the inside passenger compartment image and the face image which are associated with the same identification information of the in-vehicle apparatus, and
transmits the seated position, which is a judgment result, and the identification information of the mobile terminal corresponding to the seated position to the in-vehicle apparatus; and
wherein the in-vehicle apparatus:
stores the seated position and the identification information of the mobile terminal, which are received from the seated position judgment unit, by associating the seated position with the identification information of the mobile terminal, and
identifies the seated position on the basis of the identification information of the mobile terminal and executes control according to the seated position of the user of the mobile terminal when accepting a specified control request from the mobile terminal.

2. The in-vehicle apparatus control system according to claim 1,
wherein the mobile terminal image capturing unit captures the face image after the in-vehicle coupling unit acquires the identification information of the in-vehicle apparatus,
the face image transmission unit that associates the face image with the identification information of the mobile terminal and transmits the face image to a server.

3. An in-vehicle apparatus control method for controlling an in-vehicle apparatus installed in a vehicle and capable of communicating with a mobile terminal,
the in-vehicle apparatus control method comprising:
a step executed by the mobile terminal acquiring the identification information of the in-vehicle apparatus upon beginning communication with the in-vehicle apparatus;
a step executed by the mobile terminal transmitting, to a server, a user's face image captured by the mobile terminal associated with the identification information of the mobile terminal and the identification information of the in-vehicle apparatus;

a step executed by the server storing the user's face image by associating the face image with identification information of the mobile terminal and the identification information of the in-vehicle apparatus;

a step executed by the in-vehicle apparatus transmitting, to the server, an inside passenger compartment image associated with the identification information of the in-vehicle apparatus, wherein the inside passenger compartment image is an image which has been captured by the in-vehicle apparatus and is an image of an inside of a passenger compartment, a step executed by the server judging a seated position of the user by means of facial recognition by using the inside passenger compartment image and the face image which are associated with the same identification information of the in-vehicle apparatus;

a step executed by the server transmitting the seated position, as a judgment result, and the identification information of the mobile terminal corresponding to the seated position to the in-vehicle apparatus;

a step executed by the in-vehicle apparatus comprising storing the seated position and the identification information of the mobile terminal, which are received from the seated position judgment unit, by associating the seated position with the identification information of the mobile terminal, and identifying the seated position on the basis of the identification information of the mobile terminal; and a step executed by the in-vehicle apparatus identifying the seated position on the basis of the identification information of the mobile terminal and executing control according to the seated position of the user of the mobile terminal when receiving a specified control request from the mobile terminal.

* * * * *